(12) United States Patent
Shimizu et al.

(10) Patent No.: US 6,194,033 B1
(45) Date of Patent: Feb. 27, 2001

(54) RUST PREVENTIVE COMPOSITION

(75) Inventors: Toshihide Shimizu, Urayasu; Mikio Watanabe, Hasaki-machi, both of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/458,993

(22) Filed: Dec. 10, 1999

(30) Foreign Application Priority Data

Dec. 10, 1998 (JP) .................................................. 10-351630

(51) Int. Cl.⁷ ..................................................... B05D 3/02
(52) U.S. Cl. ..................................... 427/388.1; 252/389.3
(58) Field of Search ........................ 252/389.3; 427/388.1

(56) References Cited

FOREIGN PATENT DOCUMENTS

| | | |
|---|---|---|
| 957145 | * 11/1999 | (EP) . |
| 1116016 | * 6/1968 | (GB) . |
| 61-060884 | * 3/1986 | (JP) . |

* cited by examiner

*Primary Examiner*—Erma Cameron
(74) *Attorney, Agent, or Firm*—Oblon, Spivak, McClelland, Maier & Neustadt, P.C.

(57) ABSTRACT

Disclosed is a rust-preventive composition comprising (A) an aromatic compound i) containing a group selected from the group consisting of an —N═N— group, a >C═N— group, a >C═O group and an —N═O group and ii) having an absorption band in a visible region of from 530 nm to 750 nm; (B) a colloidal silica; (C) a film-forming polymeric compound containing in one molecule a group selected from the group consisting of an —OH group and a —COOH group; and (D) an organic solvent. This composition, having been coated on metal surfaces, provides a sufficient corrosion resistance without making any chromating treatment.

10 Claims, No Drawings

RUST PREVENTIVE COMPOSITION

BACKGROUND OF THE INVENTION

1. Field of the Invention

This invention relates to a rust-preventive composition for the surfaces of metals such as steel sheets used in automobiles, construction material products and so forth.

2. Description of the Prior Art

Steel sheets used in automobiles and construction material products, in particular, zinc-plated (galvanized) or zinc-alloy-plated steel sheets are coated before their use. They are passed through various steps before coating, and also are left uncoated for a fairly long time in that course. Hence, there are problems that the plated steel sheets may rust in that course, or various substances may become adsorbed on or adhere to their surfaces, so that coating materials to be applied thereafter may have a poor adhesion.

Accordingly, the plated steel sheets are subjected to chromating as primary rust-preventive treatment made before coating. Corrosion resistance attributable to this chromating may commonly only last for about 48 hours in a salt spray test made according to JIS Z-2371, and is insufficient if the chromating only is made, when left in a severe corrosive environment over a long period of time. Under such circumstances, a coating type special method of chromating is proposed in which a chromating liquid to which a silica sol has been added is used, at the stage of chromating. This method can provide a corrosion-resistant effect lasting for 100 to 200 hours in the salt spray test.

However, hexavalent chromium is contained in coating films themselves which are formed by such special chromating. This hexavalent chromium is known to cause an allergy (chromate ulcer) when the skin is stained with it. A possibility of carcinogenesis is also pointed out. Thus, there is a problem on safety. As a method not making use of any hexavalent chromium, it has been proposed to apply trivalent chromium plating further on zinc alloy plating. This method, however, can not achieve a sufficient corrosion resistance.

SUMMARY OF THE INVENTION

Accordingly, it is sought to provide a technique for making rust-preventive treatment on metal surfaces, which can achieve a sufficient corrosion resistance in the salt spray test even without making any chromating, and also promises a high safety.

The present invention meets such a demand. Thus, an object of the present invention is to provide a metal surface rust-preventive composition which can achieve a sufficient corrosion resistance without making any chromating and also has a high safety.

To achieve the above object, the present invention provides a rust-preventive composition comprising;

(A) an aromatic compound i) containing in one molecule at least one group selected from the group consisting of an —N=N— group, a >C=N— group, a >C=O group and an —N=O group and ii) having an absorption band in a visible region of from 530 nm to 750 nm;

(B) a colloidal silica;

(C) a film-forming polymeric compound containing in one molecule a group selected from the group consisting of an —OH group and a —COOH group; and (D) an organic solvent.

DESCRIPTION OF THE REFERRED EMBODIMENTS

The present invention will be described below in detail.

(A) Aromatic Compound:

The component-(A) aromatic compound may be any aromatic compound as long as it fulfills the conditions of i) containing in one molecule at least one group selected from the group consisting of an —N=N— group, a >C=N— group, a >C=O group and an —N=O group and ii) having an absorption band in a visible region of from 530 nm to 750 nm.

As the aromatic compound that fulfills the above conditions, preferably usable are dyes such as direct dyes, acid dyes, basic dyes, mordant dyes, acid mordant dyes, vat dyes, disperse dyes, oil colors, reactive dyes and food colorants.

As specific examples of the above dyes, they may include the following.

Examples of Direct Dyes:

C.I. Direct Violet 1, 7, 9, 12, 22, 35, 47, 48, 51, 90, 94, 98;

C.I. Direct Blue 1, 2, 6, 8, 15, 22, 25, 41, 71, 76, 77, 78, 80, 86, 96, 98, 106, 108, 120, 158, 160, 163, 165, 168, 192, 193, 194, 195, 196, 199, 200, 201, 202, 203, 207, 225, 226, 236, 237, 246, 248, 249;

C.I. Direct Green 1, 6, 8, 28, 30, 31, 33, 59, 63, 64, 74;

C.I. Direct Brown 2, 44; and

C.I. Direct Black 17, 19, 22, 32, 38, 51, 56, 62, 71, 74, 75, 77, 94, 105, 106, 107, 108, 112, 113, 117, 118, 132, 133, 146.

Examples of Acid Dyes:

C.I. Acid Violet 7, 11, 15, 31, 34, 35, 41, 43, 47, 48, 49, 51, 54, 66, 68, 75, 78, 97, 106;

C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 175, 182, 183, 184, 187, 192, 199, 203, 204, 205, 229, 234, 236;

C.I. Acid Green 3, 7, 9, 12, 16, 19, 20, 25, 27, 28, 35, 36, 40, 41, 43, 44, 48, 56, 57, 60, 61, 65, 73, 75, 76, 78, 79;

C.I. Acid Brown 295; and

C.I. Acid Black 1, 2, 7, 24, 26, 29, 31, 44, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191.

Examples of Basic Dyes:

C.I. Basic Violet 1, 3, 7, 10, 14, 15, 21, 25, 26, 27, 28;

C.I. Basic Blue 1, 3, 5, 7, 9, 19, 21, 22, 24, 25, 26, 28, 29, 40, 41, 44, 45, 47, 54, 58, 59, 60, 64, 65, 66, 67, 68;

C.I. Basic Green 1, 4, 6; and

C.I. Basic Black 2, 8.

Examples of Mordant Dyes and Acid Mordant Dyes:

C.I. Mordant Violet 1, 5, 44;

C.I. Mordant Blue 1, 7, 8, 13, 29, 44, 47, 48, 58, 75, 76;

C.I. Mordant Green 11, 15, 17, 47; and

C.I. Mordant Black 1, 3, 7, 9, 11, 17, 26, 32, 38, 43, 44, 51, 54, 65, 75, 77, 84, 85, 86, 87.

Examples of Vat Dyes:

C.I. Vat Violet 1, 2, 9, 13, 21;

C.I. Vat Blue 1, 3, 4, 5, 8, 12, 14, 18, 19, 20, 29, 35, 41, 64, 66, 67, 72;

C.I. Vat Green 1, 2, 8, 9, 13, 43, 44, 45;

C.I. Vat Brown 3, 72; and

C.I. Vat Black 8, 9, 13, 14, 20, 25, 27, 29, 36, 56, 57, 59, 60.

Examples of Disperse Dyes:

C.I. Disperse Violet 1, 4, 8, 10, 18, 23, 24, 26, 28, 30, 33, 37;

C. I. Disperse Blue 1, 3, 5, 6, 7, 20, 26, 27, 43, 44, 52, 54, 55, 56, 58, 60, 61, 62, 64, 72, 73, 75, 79, 81, 85, 87, 90, 91, 92, 94, 97, 98, 99, 103, 104, 105, 106, 108, 113; and C.I. Disperse Black 1, 2, 10, 26, 27, 28, 29, 30, 31.

Examples of Oil Colors:

C.I. Solvent Violet 8, 13, 14, 21, 27;

C.I. Solvent Blue 2, 11, 12, 25, 35, 36, 55, 73; and

C.I. Solvent Black 3, 5, 7, 22, 23, 123.

Examples of Reactive Dyes:

C.I. Reactive Violet 1, 2, 4, 5, 8, 9, 10;

C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46;

C.I. Reactive Green 5, 6, 7, 8;

C.I. Reactive Brown 10; and

C.I. Reactive Black 1, 3, 4, 5, 6, 8, 9, 10, 12, 13, 14, 18.

Examples of Food Colorants:

C.I. Food Violet 2;

C.I. Food Blue 1, 2; and

C.I. Food Green 2.

Of these, preferred dyes are dyes insoluble in water. Among those exemplified above, oil colors are preferred.

The component-(A) aromatic compound may be used alone or in combination of two or more types.

(B) Colloidal Silica:

The component-(B) colloidal silica is a colloid comprising i) a dispersion medium comprised of water, an organic solvent such as methanol, propanol, isopropanol or ethylene glycol, or a mixed solvent of water and the organic solvent and ii) ultrafine silica particles (usually having a particle diameter of from 5 to 500 nm) dispersed therein.

As a typical process for producing colloidal silica by using the water, a method is known in which hydrochloric acid is added to an aqueous sodium silicate solution. As a typical process for producing colloidal silica by using the organic solvent, a method is known in which a silicate such as tetraethoxysilane is subjected to hydrolysis reaction in an organic solvent such as isopropanol and in the presence of a small quantity of a mixed catalyst of pure water and ethyl amine or the like. The colloidal silica used in the present invention, however, is not particularly limited to those produced by these processes. Those obtained by any known processes may be used.

The component-(B) colloidal silica may usually be used in an amount of from 10 to 1,000 parts by weight, and preferably from 30 to 500 parts by weight, based on 100 parts by weight of the component-(A) aromatic compound.

(C) Polymeric Compound:

The component-(C) polymeric compound may be any polymeric compound as long as it contains in one molecule a group selected from the group consisting of an —OH group and a —COOH group and is capable of forming a film.

Such a polymeric compound may include, e.g., poly(vinyl alcohol), poly(vinyl butyral), polyacrylic acid, phenolic resins, carboxyl-modified phenolic resins, polyvinylphenol resins [e.g., poly(p-vinylphenol)], a copolymer of p-vinylphenol with 2-hydroxyethyl methacrylate, bromides of poly(p-vinylphenol), a copolymer of p-vinylphenol with styrene, a copolymer of p-vinylphenol with butyl acrylate, pectin, shellac resin, alginic acid, starch, chitin, chitosan, poly(vinyl acetal), polyester resins, alkyd resins, urethane resins, polyalkylene glycols, epoxy resins, and a copolymer of vinyl acetate with vinyl alcohol. In particular, preferred are poly(vinyl butyral), polyacrylic acids, phenolic resins, carboxyl-modified phenolic resins, polyvinylphenol resins, shellac, polyester resins and epoxy resins. Any of these polymeric compounds may be used alone or in combination of two or more types.

The component-(C) polymeric compound may usually be used in an amount of from 1 to 500 parts by weight, and preferably from 10 to 250 parts by weight, based on 100 parts by weight of the component-(A) aromatic compound.

(D) Organic Solvent:

An organic solvent is used in the rust-preventive composition of the present invention in order to prepare it as a liquid composition.

As the organic solvent, usable are, e.g., aliphatic hydrocarbons such as hexane, aromatic hydrocarbons such as toluene, xylene, cyclohexanone and tetrahydrofuran, esters such as ethyl acetate and butyl acetate, ketones such as methyl isobutyl ketone, alcohols such as methanol, ethanol and propanol, formamides such as N,N-dimethylformamide and N,N-diethylformamide, acetamides such as N,N-dimethylacetamide and N,N-diethylacetamide, dioxane, N-methyl-2-pyrrolidone, 1,3-dimethyl-2-imidazolidinone, and isophorone. Any of these organic solvents may be used alone or in combination of two or more types, and also, as long as the effect of the present invention is not damaged, may be mixed with water so as to be used as a mixed solvent.

The component-(D) organic solvent or the mixed solvent may usually be so mixed that the components (A) to (C) are in a concentration of from 0.1 to 25% by weight, and preferably from 1 to 10 parts by weight, in total, based on the total weight of the liquid composition.

Other Optional Components:

To the rust-preventive composition of the present invention, a curing agent, an organic acid, a surface-active agent, a lubricant and so forth may optionally be added as long as the effect of the present invention is not damaged. The curing agent may include, e.g., butylated melamine resins, butylated urea resins, methylated melamine resins and blocked isocyanate resins; the organic acid, e.g., benzoic acid, salicylic acid, tannic acid, gluconic acid, gallic acid, toluenesulfonic acid and phytic acid; the surface-active agent, e.g., known anionic, cationic, nonionic or amphoteric surface-active agents; and the lubricant, e.g., fatty acids such as stearic acid, or salts thereof.

Preparation of Rust-preventive Composition:

The rust-preventive composition of the present invention is prepared by dissolving or dispersing the components (A) to (C) and optionally other optional components in the component-(D) organic solvent or in the mixed solvent thereof.

How to Use Rust-preventive Composition:

The rust-preventive composition thus obtained may be used as a coating preparation by coating it on the surfaces of metals on which rust-preventive treatment must be made, i.e., metals tending to rust. The metals to be coated may include, e.g., iron and iron alloys, aluminum and aluminum alloys, copper and copper alloys, zinc and zinc alloys, nickel and nickel alloys, tin and tin alloys, and trivalent chromium. Particularly preferred typical metals are zinc of zinc plating, zinc alloys of Zn—Ni, Zn—Fe, Zn—Co, Zn—Fe—Co, Zn—Al and Sn—Zn plating and trivalent chromium of trivalent chromium plating, applied on substrate surfaces.

There are no particular limitations on how to coat the rust-preventive composition as a coating preparation. For example, methods such as roll coating, spray coating, shower coating, dip coating and electrodeposition may be used. Incidentally, the metal surfaces treated with the rust-preventive composition of the present invention are usually dark bluish to blackish.

EXAMPLES

The present invention will be described below by giving Examples and Comparative Examples.

Examples & Comparative Examples

Making-up of Coating Preparations Nos. 1 to 18:

As shown in Tables 1 and 2, Coating Preparations Nos. 1 to 18 were prepared by adding the component-(A) aromatic compound, the component-(B) colloidal silica and the component-(C) polymeric compound in the component-(D) organic solvent, the former being so added that the total concentration of (A)+(B)+(D) was in the value shown in the tables; and mixing them with stirring at about 25° C. for 3 hours. When the component (C) was not readily soluble in the component (D), they were stirred and mixed while being heated to 50 to 60° C.

The colloidal silicas used in Coating Preparations Nos. 1 to 16 and 18 as shown in Tables 1 and 2 are shown in Table 3. The polymeric compounds used in Coating Preparations Nos. 1 to 17 are shown in Table 4.

In Tables 1 and 2, Coating Preparations Nos. 1 to 15 are Examples. Coating Preparation No. 16* is Comparative Example not making use of the component-(A) aromatic compound. Coating Preparation No. 17* is Comparative Example not making use of the component-(B) colloidal silica. Coating Preparation No. 18* is Comparative Example not making use of the component-(C) polymeric compound.

TABLE 1

| Coating Preparation No. | (A) Aromatic compound | (B) Colloidal silica | (C) Polymeric compound | (A)/(B)/(C) (weight ratio) | (A) + (B) + (C) Total concentration (wt. %) | (D) Organic solvent |
| --- | --- | --- | --- | --- | --- | --- |
| 1 | C.I. Solvent Black 7 | a | h | 100/50/50 | 4 | tetra-hydro-furan |
| 2 | C.I. Solvent Blue 11 | b | i | 100/100/50 | 5 | tetra-hydro-furan |
| 3 | C.I. Solvent Blue 36 | c | j | 100/30/20 | 3 | tetra-hydro-furan |
| 4 | C.I. Solvent Black 3 | d | k | 100/50/50 | 4 | tetra-hydro-furan |
| 5 | C.I. Solvent Black 5 | e | l | 100/100/100 | 3 | tetra-hydro-furan |
| 6 | C.I. Solvent Black 23 | f | m | 100/150/100 | 3.5 | tetra-hydro-furan |
| 7 | C.I. Solvent Black 22 | g | n | 100/100/50 | 5 | tetra-hydro-furan |
| 8 | C.I. Solvent Blue 2 | a | h | 100/50/100 | 5 | N-methyl-2-pyrrolidone |
| 9 | C.I. Solvent Blue 35 | b | h | 100/20/30 | 3 | N-methyl-2-pyrrolidone |
| 10 | C.I. Solvent Black 7 | c | h | 100/200/50 | 3.5 | 1,3-dimethyl-2-imidazolidinone |

TABLE 2

| Coating Preparation No. | (A) Aromatic compound | (B) Colloidal silica | (C) Polymeric compound | (A)/(B)/(C) (weight ratio) | (A) + (B) + (C) Total concentration (wt. %) | (D) Organic solvent |
| --- | --- | --- | --- | --- | --- | --- |
| 11 | C.I. Solvent Black 7 | d | h | 100/100/150 | 3.5 | 1,3-dimethyl-2-imidazolidinone |

TABLE 2-continued

| Coating Preparation No. | (A) Aromatic compound | (B) Colloidal silica | (C) Polymeric compound | (A)/(B)/(C) (weight ratio) | (A) + (B) + (C) Total concentration (wt. %) | (D) Organic solvent |
|---|---|---|---|---|---|---|
| 12 | C.I. Solvent Black 7 | e | i | 100/30/20 | 3 | 1,3-dimethyl-2-imidazolidinone |
| 13 | C.I. Vat Violet 2 | g | k | 100/50/50 | 4 | methanol |
| 14 | C.I. Basic Black 8 | a | l | 100/30/20 | 3 | methanol |
| 15 | C.I. Vat Black 14 | a | m | 100/50/50 | 4 | methanol |
| 16* | None | a | h | 0/50/50 | 4 | tetrahydrofuran |
| 17* | C.I. Solvent Black 7 | None | h | 100/0/50 | 4 | tetrahydrofuran |
| 18* | C.I. Solvent Black 7 | a | None | 100/50/0 | 4 | tetrahydrofuran |

TABLE 3

| (B) Colloidal silica | Product name (trade name) | Particle diameter (nm) | Manufacturer |
|---|---|---|---|
| a | MA-ST-M | 20~30 | Nissan Chemical Industries, Ltd. |
| b | IPA-ST | 10~20 | " |
| c | MEK-ST | 10~20 | " |
| d | MIBK-ST | 10~20 | " |
| e | ST-UP | 40~100 | " |
| f | MA-ST-S | 7~15 | " |
| g | — | 100~150 | Produced by the inventors by the sol-gel process in the following way. |

Production of Colloidal Silica g:

Into a reaction vessel having a dropping funnel, a thermometer and a stirrer, 40 parts by weight of a partial condensate of tetraethoxysilane (available from Tama Chemical Co., Ltd.; trade name: ETHYLSILICATE 40) and 100 parts by weight of propylene glycol monomethyl ether were charged. After the temperature was raised to 70° C., a solution of mixture of 0.3 part by weight of ethylamine, 10.0 parts by weight of pure water and 25.0 parts by weight of propylene glycol monomethyl ether was slowly added dropwise. In this state, the reaction was carried out at 70° C. for 3 hours to obtain a cloudy dispersion in which fine silica particles had precipitated. To the resulting dispersion, a solution prepared by diluting 2.8 parts by weight of tetra-i-propoxytitanium with 10 parts by weight of propylene glycol monomethyl ether was slowly added dropwise, and the reaction was carried out at 70° C. for 2 hours to obtain a cloudy dispersion in which a composite silica had precipitated. This cloudy dispersion was further concentrated under reduced pressure to adjust its heating residue to 20%.

TABLE 4

| (C) Polymeric compound | Product name (or trade name) | Type of resin | Manufacturer |
|---|---|---|---|
| h | EP-1004 | bisphenol-A epoxy resin | Yuka Shell Epoxy K.K. |
| i | S-LEC BL-1 | poly(vinyl butyral) resin | Sekisui Chemical Co., Ltd |
| j | PES-350 | polyester resin | Toagosei Chemical Industry Co., Ltd. |
| k | polyacrylic acid (average degree of polymerization: 250,000) | polyacrylic acid (acrylic resin) | Wako Pure Chemical Industries, Ltd |
| l | poly(vinyl butyral) (average degree of polymerization: about 700) | poly(vinyl butyral) resin | Wako Pure Chemical Industries, Ltd. |
| m | MARUKA LYNCUR M | p-vinylphenol resin | Maruzen Petro-chemical Co., Ltd. |
| n | E-500-4A | phenolic resin | Toyo Ink Mfg. Co., Ltd. |

Evaluation Test (1)

As test steel sheets, rolled steels (cold-rolled steel plate SGCC according to JIS G 3302) having dimensions of 150 mm×70 mm×0.8 mm and surface-plated with Zn—Fe—Co alloy were used. Eighteen sheets were prepared for the steels. These steel sheets were respectively dip-coated with Coating Preparations Nos. 1 to 18 prepared as described above, and thereafter left at 70° C. for 2 hours to dryness, thus coatings were formed on the steel sheet surfaces. The test steel sheets thus obtained were tested in the following way. Results obtained are shown in Table 5.

Evaluation of External Appearance:

The external appearance of each coating surface of the test steel sheets was visually observed.

Corrosion Resistance Test:

A salt spray test was made on the test steel sheets according to JIS Z-2371. Coating surfaces of the test steel sheets were observed at intervals of 24 hours to measure the time until white rust appeared on the test steel sheets in their area of 5% or larger.

Evaluation of Storage Stability:

Coating Preparations Nos. 1 to 18 prepared as described above were each put in a 100 ml test tube in an amount of 100 ml, and left at rest. Whether or not any precipitate appeared was visually observed at intervals of 24 hours to measure the time until precipitates appeared.

Evaluation Test (2)

As test steel sheets, rolled steels (SGCC) having dimensions of 150 mm×70 mm×0.8 mm, surface-plated with Zn—Fe—Co alloy and thereafter further plated with trivalent chromium were used. Eighteen sheets were prepared for the steels. These steel sheets were respectively dip-coated with Coating Preparations Nos. 1 to 18 prepared as described above, and thereafter left at 70° C. for 2 hours to dryness, thus coatings were formed on the steel sheet surfaces. The test steel sheets thus obtained were put to only the above corrosion resistance test. Results obtained are shown in Tables 5 and 6. In Tables 5 and 6, Test No.1 to No.15 are those for Examples, and Test No.16* to No.18* and No.34* to No.36*, Comparative Examples.

TABLE 5

| Test No. | Coating Preparation No. | Corrosion resistance (hours) | External appearance | Storage stability (hours) |
| --- | --- | --- | --- | --- |
| 1 | 1 | 48 or more | black | 72 or more |
| 2 | 2 | 48 or more | black | 72 or more |
| 3 | 3 | 48 or more | dark blue | 72 or more |
| 4 | 4 | 48 or more | dark blue | 72 or more |
| 5 | 5 | 48 or more | black | 72 or more |
| 6 | 6 | 48 or more | black | 72 or more |
| 7 | 7 | 48 or more | black | 72 or more |
| 8 | 8 | 48 or more | dark blue | 72 or more |
| 9 | 9 | 48 or more | dark blue | 72 or more |
| 10 | 10 | 48 or more | black | 72 or more |
| 11 | 11 | 48 or more | black | 72 or more |
| 12 | 12 | 48 or more | black | 72 or more |
| 13 | 13 | 48 or more | violet black | 24 |
| 14 | 14 | 48 or more | black | 48 |
| 15 | 15 | 48 or more | black | 24 |
| 16* | 16* | 24 | white | 72 or more |
| 17* | 17* | 24 | black | 72 or more |
| 18* | 18* | 24 | black | 72 or more |

TABLE 6

| Test No. | Coating Preparation No. | Corrosion resistance (hours) |
| --- | --- | --- |
| 19 | 1 | 144 |
| 20 | 2 | 144 |
| 21 | 3 | 144 |
| 22 | 4 | 144 |
| 23 | 5 | 144 |
| 24 | 6 | 144 |
| 25 | 7 | 144 |
| 26 | 8 | 144 |
| 27 | 9 | 144 |
| 28 | 10 | 144 |
| 29 | 11 | 144 |
| 30 | 12 | 144 |
| 31 | 13 | 120 |
| 32 | 14 | 120 |
| 33 | 15 | 120 |
| 34* | 16* | 24 |
| 35* | 17* | 48 |
| 36* | 18* | 24 |

As described above, the rust-preventive composition of the present invention can impart a sufficient corrosion resistance to metal surfaces on which rust-preventive treatment must be made, even without making chromating treatment. Moreover, the present rust-preventive composition has a high safety and is free from any sanitary anxiety such as allergy and carcinogenesis caused by hexavalent chromium, about which people have been anxious in conventional chromating. Thus, this is a rust-preventive composition suited for primary rust-preventive treatment of metals.

What is claimed is:

1. A rust-preventive composition comprising the following components;
    (A) an aromatic compound i) containing in one molecule at least one group selected from the group consisting of an —N═N— group, a >C═N— group, a >C═O group and an —N═O group and ii) having an absorption band in a visible region of from 530 nm to 750 nm;
    (B) a colloidal silica;
    (C) a film-forming polymeric compound containing in one molecule a group selected from the group consisting of an —OH group and a —COOH group; and
    (D) an organic solvent,
        wherein the component (A) aromatic compound is a compound selected from the group consisting of a direct dye, an acid dye, a basic dye, a mordant dye, an acid mordant dye, a vat dye, a disperse dye, an oil color, a reactive dye and a food colorant being soluble in organic solvent (D), and
        wherein the component (B) and the component (C) are present in amounts of from 10 parts by weight to 1,000 parts by weight and from 1 part by weight to 500 parts by weight, respectively, based on 100 parts by weight of component (A) and component (D) is present in such an amount that the components (A) to (C) are in a concentration of from 0.1 to 25% by weight in total in the whole composition.

2. The composition of claim 1, wherein the component-(A) aromatic compound is an oil color.

3. The composition of claim 2, wherein said oil color is selected from the group consisting of C.I. Solvent Violet 8, 13, 14, 21 and 27; C.I. Solvent Blue 2, 11, 12, 25, 35, 36, 55 and 73; and C.I. Solvent Black 3, 5, 7, 22, 23 and 123.

4. The composition of claim 1, wherein the component-(B) colloidal silica is present in a dispersion medium comprising water, an organic solvent or a mixed solvent of water and an organic solvent.

5. The composition of claim 1, wherein the component-(C) film-forming polymeric compound is selected from the group consisting of poly(vinyl alcohol), polyvinyl butyral), polyacrylic acid, a phenolic resin, a carboxyl-modified phenolic resin, a polyvinylphenol resin, a copolymer of p-vinylphenol with 2-hydroxyethyl methacrylate, a bromide of poly(p-vinylphenol), a copolymer of p-vinylphenol with styrene, a copolymer of p-vinylphenol with butyl acrylate, pectin, a shellac resin, alginic acid, starch, chitin, chitosan, poly(vinyl acetal), a polyester resin, an alkyd resin, a urethane resin, a polyalkylene glycol, an epoxy resin, and a copolymer of vinyl acetate with vinyl alcohol.

6. The composition of claim 1, wherein the component-(C) film-forming polymeric compound is selected from the group consisting of poly(vinyl butyral), polyacrylic acid, a phenolic resin, a carboxyl-modified phenolic resin, a polyvinylphenol resin, a shellac resin, a polyester resin and an epoxy resin.

7. The composition of claim 1, wherein the component-(D) organic solvent is selected from the group consisting of an aliphatic hydrocarbon, an aromatic hydrocarbon, an ester, a ketone, an alcohol, a formamide, an acetamide, dioxane, N-methyl-2-pyrrolidone, 1,3-diemethyl-2-imidazolidinone and isophorone.

8. The composition of claim 1, which further comprises a component selected from the group consisting of a curing agent, an organic acid, a surface-active agent and a lubricant.

9. A metal surface rust-preventive method comprising coating on the surface of a metal the composition according to claim 1, followed by drying to form a dried coating.

10. The method of claim 9, wherein said surface of a metal is the surface of a metal selected from the group consisting of iron, an iron alloy, aluminum, an aluminum alloy, copper, a copper alloy, zinc, a zinc alloy, nickel, a nickel alloy, tin, a tin alloy, and trivalent chromium.

* * * * *